United States Patent [19]

Ikonomou et al.

[11] Patent Number: 5,413,675
[45] Date of Patent: May 9, 1995

[54] METHOD OF DEINKING LASER PRINTED WASTEPAPER

[75] Inventors: George D. Ikonomou, Mount Pleasant, S.C.; David K. Lo, Silver Spring, Md.

[73] Assignee: Westvaco Corporation, New York, N.Y.

[21] Appl. No.: 57,784

[22] Filed: May 6, 1993

[51] Int. Cl.⁶ .................................................. D21C 5/02
[52] U.S. Cl. ............................................ 162/5; 162/29; 162/41; 162/189
[58] Field of Search .................. 162/5, 8, 29, 41, 264, 162/189, 190, 191

[56] References Cited

U.S. PATENT DOCUMENTS

| | | | |
|---|---|---|---|
| 2,703,754 | 7/1949 | Myers | 162/5 |
| 3,051,609 | 7/1960 | Grossman et al. | 162/5 |
| 3,058,871 | 10/1962 | Davis et al. | 162/5 |
| 3,072,521 | 1/1963 | Samuelson et al. | 162/5 |
| 3,253,976 | 5/1966 | Bocci | 162/5 |
| 3,635,762 | 1/1972 | Ott et al. | 134/1 |
| 3,635,789 | 1/1972 | Green | 162/5 |
| 4,276,118 | 1/1981 | Quick | 162/5 |
| 4,561,933 | 12/1985 | Wood et al. | 161/5 |
| 4,872,953 | 10/1989 | Smith | 162/261 |
| 4,915,821 | 4/1990 | Lamort | 209/17 |
| 4,971,656 | 11/1990 | Lehmann et al. | 162/5 |
| 5,102,500 | 4/1992 | Darlington | 162/5 |
| 5,137,599 | 8/1992 | Maxham | 162/5 |
| 5,151,598 | 8/1992 | Richman et al. | 161/5 |
| 5,217,573 | 6/1993 | Tsai et al. | 162/5 |
| 5,288,782 | 2/1994 | Nakajima et al. | 93/24 |
| 5,314,580 | 5/1994 | Di Tullio | 162/5 |

FOREIGN PATENT DOCUMENTS 335260 10/1989 European Pat. Off. .
2756711 5/1978 Germany .

OTHER PUBLICATIONS

"A New Look at Deinking With Solvents", by Lyman C. Aldrich, Tappi Journal, vol. 60, No. 8, Aug. 1977, pp. 114–116.
"New Dry Process Intrigues Deinkers", by Ernest F. Barker, Paper Trade Journal, 143 (43), 1959, pp. 28–34.
Ultrasonic Deinking of Wastepaper, TAPPI Journal, L. L. Turai and C. H. Teng, Feb., 1978, vol. 61, No. 2, pp. 31÷34.
Ultrasonic Deinking of Wastepaper, TAPPI Journal, L. L. Turai and C. H. Teng, Jan., 1979, vol. 62, No. 1, pp. 45–47.
Deinking of Waste Newspaper Under Ultrasonic Irradiation, China Pulp and Paper, 8(2), 34–40 (1989).

Primary Examiner—W. Gary Jones
Assistant Examiner—Mark De Simone

[57] ABSTRACT

A process for deinking wastepaper printed with heat fused inks to provide a source of deinked paper which can be reused or repulped and converted into a recycled paper product comprises immersing the wastepaper in a non-aqueous solvent bath containing a solvent capable of dissolving the binder component of the ink, and subjecting the wastepaper to low frequency ultrasound energy to separate the ink particles from the wastepaper. The separated ink particles may be collected magnetically or otherwise and the excess solvent recovered and reintroduced into the solvent bath.

1 Claim, 1 Drawing Sheet

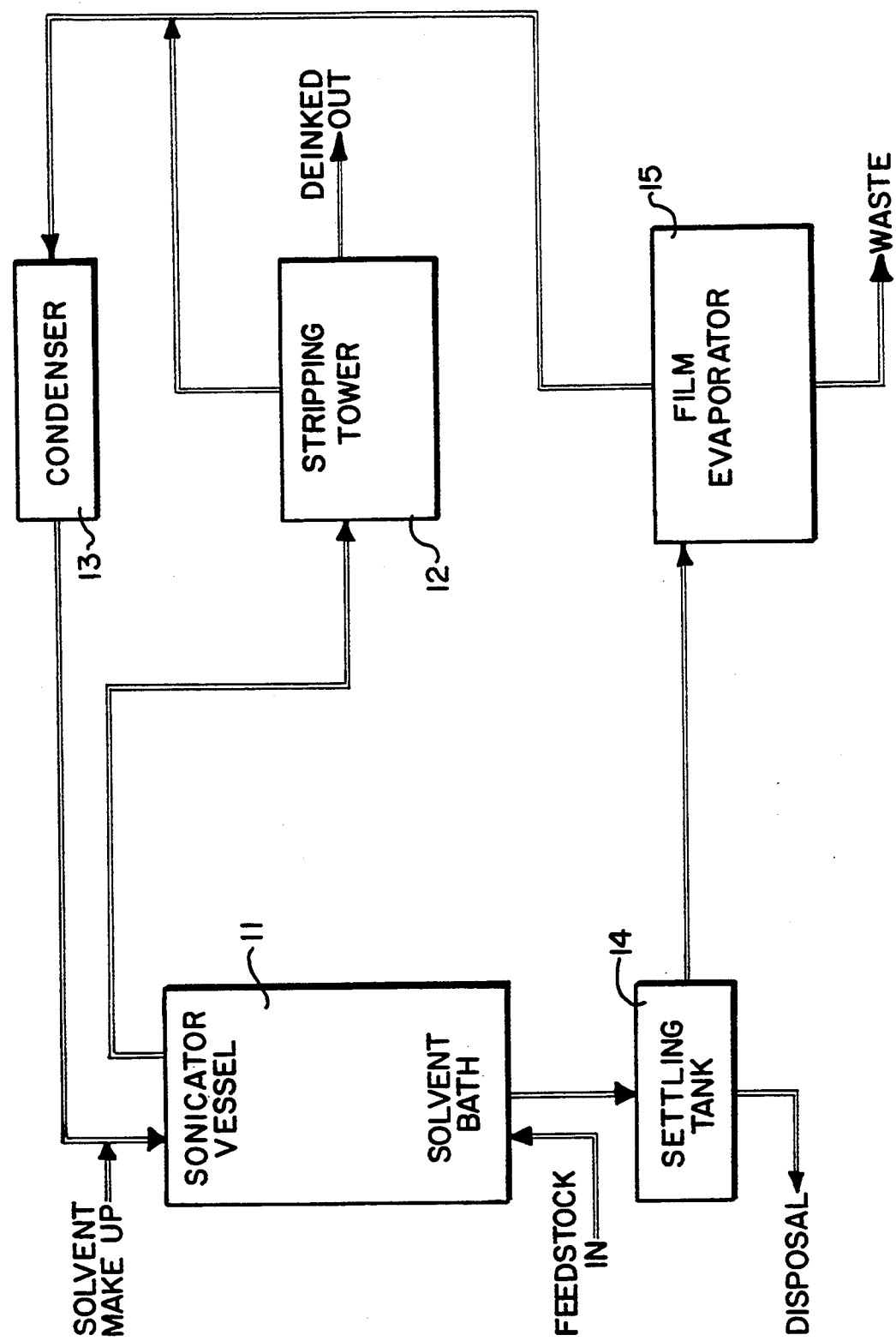

METHOD OF DEINKING LASER PRINTED WASTEPAPER

BACKGROUND OF THE INVENTION

The present invention relates to a process for deinking wastepaper printed with heat fusible inks such as laser inks, and more particularly to such a process which does not require that the wastepaper be repulped prior to treatment. The process uses low frequency ultrasound in conjunction with an organic solvent to remove the fused ink particles from the wastepaper.

There are reports in the literature of ink removal by solvent treatment. Likewise, the use of ultrasound in deinking is known. However, the present invention is the first instance where the two separately known treatments have been combined particularly for deinking laser printed paper.

Conventional methods of deinking and reclaiming wastepaper used in the past involve treating the wastepaper with various deinking chemicals. Such methods were reasonably satisfactory and adequate for paper printed with standard inks that were readily removed or saponified with chemicals at elevated temperatures. However, in recent years, methods of deinking involving cooking and the use of chemicals have become increasingly unsatisfactory for a number of reasons.

Ink formulations have become more and more complex and involve the use of a wide variety of synthetic resins and plasticizers with each ink manufacturer having its own special formulation. Furthermore, multicolored printing and advertisements have become more widespread and these involve a variety of new ink formulations that include new pigments, dyes and toners which cannot be removed or dissolved from wastepaper using conventional deinking chemicals. This is particularly true for laser printed paper.

Laser printed paper is one of the most difficult types of wastepaper to deink. Laser printing and xerography are variations of the same process whereby the inks are fused by heat. In the case of laser printing, both heat and pressure are used in the fusion stage. The fusion mechanism and the nature of the binder used in toner formulations makes these papers most difficult to deink.

For such wastepaper, the conventional methods of washing and flotation are not effective. Washing has been found to be useful only for ink particles less than about 25 $\mu$m. The fused toner particles are much larger than this, on the order of about 40 to 400 $\mu$m. Screening is also ineffective for the toner particles used in laser printing because of their plate-like shape. Laser printing inks contain a polymer binder and carbon black pigment. The binder is typically a copolymer of styrene and methyl methacrylate (or ethyl methacrylate), with a molecular weight of 70,000 to about 100,000, and a melting temperature in the range of 100°–110° C. The weight ratio of styrene to methacrylate ranges from about 60:40 to 70:30. Since the binder is insoluble in water, aqueous deinking methods can only dislodge the ink particles from the paper fibers. The ink particles must then be agglomerated and separated from the paper fibers by flotation techniques or the like. On the other hand an appropriate solvent treatment may be used to dissolve the binder portion of the laser ink which can then be separated from the paper and collected for disposal. In the case of the present invention, a low frequency ultrasound is used to separate the toner particles from the paper.

DESCRIPTION OF PRIOR ART

There are a number of patented methods for deinking xerographic or electrostatic printed wastepaper. In U.S. Pat. No. 3,635,789, the deinking process involves re-pulping of the xerographically printed paper and mild agitation of the pulp suspension at a temperature of 150°–205° F., before the addition of an organic solvent which is skimmed off with the accumulated toner. U.S. Pat. No. 4,276,118 discloses a process where the toner is removed from the paper with a dual system of a collector such as polystyrene in the form of beads and a collecting chemical such as a saturated aliphatic primary alcohol with a melting point at or below the approximate softening point of the toner. In U.S. Pat. No. 4,561,933, the deinking process is carried out by contacting xrographically printed wastepaper pulp with a deinking agent consisting of one or more $C_5$ to $C_{20}$ alkanols in an aqueous medium of alkaline pH. Finally, in U.S. Pat. No. 5,141,598, the method for deinking dry toner electrostatic printed wastepaper comprises adding to a slurry of the wastepaper a mixture of petroleum distillates, ethanol and an ethoxylated polyoxypropylene glycol.

Meanwhile, the use of ultrasound in the deinking of wastepaper is disclosed in a number of publications, including, an article entitled "Ultrasonic Deinking of Wastepaper" by Leslie L. Turai and Chung-Haw Teng, published in *TAPPI Journal*, February 1978, Vol. 61, No. 2, pages 31–34. In this article wastepapers heavily printed with high-gloss, polymeric inks were subjected to ultrasound to disperse the ink films without the use of chemicals. A related pilot plant study by the same authors is disclosed in an article also entitled "Ultrasonic Deinking of Wastepaper", published in *TAPPI Journal*, January 1979, Vol. 62, No. 1, pages 45–47. Finally, an article entitled "Deinking of Waste Newspaper Under Ultrasonic Irradiation", by M Chen, G Tan and G Cao, appeared in *China Pulp and Paper*, 8(2), 34–40 (1989). In this study, optical microscopy of the deinked pulp revealed a superiority of deinking by ultrasound over chemical and mechanical deinking for newsprint. However, none of the known prior art teaches the novel process of the present invention wherein sheets or strips of laser printed wastepaper are deinked by suspending the printed sheets or strips in a solvent designed to dissolve the binder portion of the ink and then subjecting the suspended sheets or strips to low frequency ultrasound to separate the ink particles from the paper.

SUMMARY OF INVENTION

In accordance with the present invention, a novel process for deinking wastepaper printed with heat fusible inks has been discovered and successfully reduced to practice. The invention relates to a practical ink separation process for laser printed paper which can be carried out without first repulping the wastepaper. According to the present invention, the wastepaper in sheet or strip form is deinked, and after deinking, the sheets or strips of paper may be reused, or, if desired, repulped and converted directly into new recycled sheets. The preferred practice of the invention relies on the use of a solvent system that is designed to dissolve the binders of the heat fused inks and a low frequency ultrasound for separating the inks from the wastepaper sheets. The solvents found to be effective in the process are represented by the following classes of organic compounds, comprising, ketones, cyclic ethers, esters, alicyclics, aromatic hydrocarbons, terpenes, chlorinated hydrocarbons, cyclic amide/cyclic amine, and carbon disulfide. Generally less than about ten minutes of exposure to ultrasound is required to achieve substantially complete deinking of sheets of wastepaper suspended in one or more of the above-identified solvents. A screening sequence involving other solvents indicated that ultrasound was only effective when used with a solvent capable of dissolving the ink binder.

The process of the present invention involves first, immersing sheets of wastepaper printed with heat fusible inks in a solvent bath to dissolve the ink binder; secondly, separating the ink particles from the wastepaper; and thirdly, separating the ink particles from the solvent bath. An appropriately selected solvent accomplishes the first step. The use of low frequency ultrasound satisfies the second step, and, an appropriate separation technique is used to complete the process. Sheets of laser printed wastepaper deinked by this process have been found to retain up to 95% of the brightness of unprinted control sheets.

Ultrasound refers to sound waves of a frequency above 16 kHz, the audible limit of the human ear. The upper limit for ultrasound is about 500 MHz for liquids. The use of ultrasound in non-invasive medical diagnosis is known, and ultrasound is not alien to the pulp and paper industry. However, the only evidence of prior work with ultrasound in deinking involves the use of ultrasound for deinking non-fused inks. Likewise the use of solvents in deinking is known. However, the mere mechanical agitation of laser printed paper soaked in a solvent gave poor deinking results.

Thus it is an object of the present invention to combine two heretofore known deinking techniques for conventional inks in the effective deinking of wastepaper printed with heat fusible inks.

It is a further object of the present invention to provide a process for deinking wastepaper printed with heat fused inks that is both economical and relatively easy to practice.

It is yet another object to the present invention to provide a process which may operate on paper sheets or strips which can be repulped after deinking for use in making new recycled sheets.

Thus a particular advantage of the present invention is that the wastepaper does not have to be repulped prior to treatment. Accordingly a significant step required in most prior art deinking processes is eliminated by the present invention.

DESCRIPTION OF DRAWING

The Figure of drawing shows schematically a typical process for practicing the present invention.

DETAILED DESCRIPTION

A laboratory test method was used to examine the theory behind the present invention and to screen for useful solvents. Initially, spent toner from a laser jet printer cartridge was extracted with several non-aqueous solvents and it was found that the toner binder was readily dissolved in methyl ethyl ketone (MEK). Based on this result, paper printed with laser ink was immersed in MEK without mixing followed by washing to remove the excess ink particles. However, washing the extracted, repulped fibers with water did not remove a significant amount of the ink. The same experiment was then conducted with simple magnetic stirring. Although this method did not enhance the first result, it did show that the ink particles which were dislodged were collected on the magnetic stirring device. Subsequently the experiment was performed again in the presence of low energy ultrasound, with the result that the ink was removed effectively and rapidly from laser printed wastepaper in a relatively short time.

A possible explanation for the effectiveness of ultrasound in deinking laser printed wastepaper may be found in its mechanism. Treatment of a liquid with ultrasound waves produces a large number of microscopic bubbles of about 100 $\mu$m in diameter and lifetimes of a few milliseconds. Bubble formation is accompanied by pressures of about 500 atmospheres. Thus, the shock waves generated by cavitation of the bubbles are strong enough to dislodge the fine ink particles from the fiber matrix of the paper. It is also known that during cavitation, tremendous amounts of highly localized heat is evolved. This localized cavitational heat may also help to melt the polymer binder of the ink and facilitate its dissolution in the organic solvent phase.

A slightly larger scale deinking experiment was performed next using wide mouth bottles containing 100 ml of solvent, into which strips of laser printed wastepaper approximately 3 inches by 5 inches were immersed. The paper strips were rolled into a cylinder held together by a paper clip. Deinking was carried out in two stages. The first stage consisted of two minutes treatment with ultrasound at a frequency of about 47 kHz. The paper strips were removed from the first bottle and transferred to another containing fresh solvent. Ultrasound treatment was continued for another five minutes. It was found that the majority of the ink was removed in the first stage for all solvents. Collection of the suspended ink particles was accelerated by immersing a magnetic stirrer in the bottle. This procedure was repeated several times to accumulate enough deinked strips for making handsheets. As a control, the same paper that had passed through the laser printer but not printed was used. Both the deinked samples and controls were soaked in water overnight and made into handsheets in the usual manner.

Table I illustrates the results of the solvent screening study. The deinking results recorded for each solvent were achieved with an ultrasound treatment time of from about 1-10 minutes at a frequency of about 47 kHz. Longer times were used on the solvents which gave poor deinking performance. For the best solvents, deinking was substantially completed in from about 1-5 minutes.

TABLE 1

| Solvent Screening | |
|---|---|
| SOLVENT | DEINKING RESULTS |
| Ketones: | |
| Acetone | Good |
| Acetyl acetone | Good |
| Acetophenone | Excellent |
| Diisopropyl ketone | Excellent |
| Cyclohexanone | Excellent |
| Methyl ethyl ketone (MEK) | Excellent |
| 2-Pentanone | Excellent |
| 3-Pentanone | Excellent |
| Cyclic Ethers: | |
| 1,4-Dioxane | Excellent |
| 1,3-Dioxolane | Excellent |
| Tetrahydrofuran (THF) | Excellent |
| Esters: | |
| n-Butyl acetate | Excellent |

TABLE 1-continued

Solvent Screening

| SOLVENT | DEINKING RESULTS |
|---|---|
| Ethyl acetate | Excellent |
| Dimethyl malonate | Fair deinking |
| Hexyl acetate | Good |
| Aromatic hydrocarbons: | |
| Toluene | Good |
| Xylene | Good |
| Terpenes: | |
| Citral | Good |
| D-Limonene | Good |
| α-Pinene | Fair Deinking |
| Halogenated hydrocarbons: | |
| Carbon Tetrachloride | Excellent |
| Chloroform | Excellent |
| Methylene chloride | Good |
| Cyclic amide/cyclic amine: | |
| N-Methyl pyrrolidone | Excellent |
| Morpholine | Excellent |
| Miscellaneous: | Good |
| Carbon disulfide | |
| Alcohols: | |
| Reagent Alcohol | Very little deinking |
| Veratryl Alcohol (3,4-Dimethoxybenzyl alcohol) | No deinking |
| Alicyclics: | |
| Cyclohexane | Fair deinking |
| Cyclohexene | Good |
| Aqueous systems: | |
| 5% N-40 dispersant in 0.5 N NaOH | No deinking |
| 20% Polyvinyl pyrrolidone | No deinking |
| 50% 18-crown-6 | No deinking |
| Aliphatic hydrocarbons: | |
| Hexane | No deinking |
| n-Pentadecane | No deinking |
| Esters: | |
| Adipic acid monomethyl ester | Very little deinking |
| Dibutyl phthalate | Fair deinking |
| Dipolar aprotics: | |
| Acetonitrile | Poor deinking |
| N,N-Dimethyl formamide | Good |
| Dimethyl sulfoxide (DMSO) | Poor deinking |
| Miscellaneous: | |
| Silicone Oil | No deinking |
| VM & P naphtha | Very little deinking |

Table II presents the results from the handsheet study. A few of the better performing solvents were used for this study. The data shows that the tear strength of the handsheets prepared from the recycled deinked paper was slightly greater in most cases than the controls, while the brightness was slightly lower in all cases. These data are believed to demonstrate the effectiveness of the process disclosed herein.

TABLE II

Handsheet Study

| SOLVENT | TEAR STRENGTH DEINKED | TEAR STRENGTH CONTROL | HANDSHEET BRIGHTNESS DEINKED | HANDSHEET BRIGHTNESS CONTROL |
|---|---|---|---|---|
| Acetone | 73 | | 75.8 (90.6) | 83.7 |
| MEK | 74 | | 80.2 (95.5) | 84.0 |
| THF | 75 | 67 | 79.3 (94.6) | 83.8 |
| Toluene | 69 | | 74.4 (88.7) | 83.8 |
| D-Limonene | 68 | 67 | 73.6 (88.5) | 83.2 |

The handsheet brightness reported in Table II is based on an average of eight measurements, four from each side. The numbers in parentheses in the column for deinked handsheet brightness represent the percentage of the control brightness achieved by each deinked sample for each solvent system.

The Figure of drawing provided herein is intended to illustrate a typical embodiment for practicing the present invention on a continuous basis. For this purpose, a feedstock of wastepaper printed with heat fusible inks is introduced into a treatment vessel 11 containing a solvent bath and including an ultrasound generator. The vessel may be of the countercurrent flow type, wherein the wastepaper to be deinked is introduced into the bottom of the vessel 11, and the deinked product is removed from the top, while solvent make-up is introduced at the top of the vessel 11. The wastepaper may be introduced into the vessel 11 in any desired form, i.e., as whole sheets, strips or the like, but is preferably not introduced into the vessel 11 as pulp. After the deinking treatment, the deinked paper product is conducted to a solvent stripping tower 12 where excess solvent is removed. This solvent is preferably passed through a condenser 13 or the like before being reintroduced into vessel 11. Meanwhile, the ink particles are removed from the vessel 11 and conducted to a settling tank 14 or the like. At this point the ink particles may be disposed of by burning, deposited in a landfill, or used as recycled raw material for an ink manufacturer. Any excess solvent or mixture of solvent and binder from the settling tank 14 may also be at least partially recovered with the use of a film evaporator 15 or the like which separates the binder from the excess solvent. The evaporated solvent from evaporator 15 is passed through the solvent condenser 13 and reintroduced into vessel 11 while any binder recovered from the film evaporator 15 is burned as fuel or is land-filled.

It should be understood that any number of variations in the exemplary process described could be readily made by one skilled in the art. The only essential part of the process is the use of an ultrasound treatment vessel and an appropriate solvent for the binder of the ink applied to the wastepaper. The method used for reclaiming the ink removed from the paper is essentially a matter of choice. One advantage of the solvent treatment disclosed is that it produces no water effluent that must be treated to remove dissolved chemicals. In the example given, the used solvent is separated from the ink particles and binder, recovered and recycled to the process or to some other use with a minimum of losses and no harm to the environment.

Thus while the invention has been described in terms of a preferred embodiment, it is to be understood by those skilled in the art that various changes may be made and equivalents may be substituted for elements thereof without departing from the true spirit and scope of the invention as set forth in the appended claims.

What is claimed is:

1. A method for deinking wastepaper printed with heat fused magnetic inks on a continuous basis comprises:
   (a) providing a feedstock of shredded wastepaper in the form of sheets or strips printed with heat fused magnetic inks to a treatment vessel containing a non-aqueous solvent selected from the group consisting of ketones, cyclic ethers, alicyclics, esters, aromatic hydrocarbons, terpenes, chlorinated hydrocarbons, cyclic amide, cyclic amine and carbon disulfide for dissolving the binder component of the ink;
   (b) subjecting the treated feedstock to a source of low frequency ultrasound within the range of from about 16 kHz to 500 MHz to separate the heat fused magnetic ink particles from the wastepaper sheats or strips;

(c) removing the deinked wastepaper from the treatment vessel;

(d) collecting the separated ink particles magnetically for recovery and reuse;

(e) collecting the solvent and binder for recovery and reuse;

(f) separating and recovering excess solvent from the deinked wastepaper stream, ink particle stream and binder stream;

(g) recycling the recovered solvent into the treatment vessel after cleaning and reconditioning; and, (h) introducing make-up solvent to the treatment vessel as required.

* * * * *